United States Patent [19]

Durakis et al.

[11] 4,215,086
[45] Jul. 29, 1980

[54] METHOD OF MAKING FLAME RETARDANT EPR UNIPASS TELEPHONE DROP WIRE

[75] Inventors: Manuel A. Durakis, Brooklyn, N.Y.; John R. Reiser, Piscataway, N.J.

[73] Assignee: General Cable Corporation, Greenwich, Conn.

[21] Appl. No.: 945,332

[22] Filed: Sep. 25, 1978

Related U.S. Application Data

[63] Continuation of Ser. No. 831,474, Sep. 8, 1977, abandoned.

[51] Int. Cl.$^3$ .............................................. B29F 3/10
[52] U.S. Cl. ........................... 264/135; 174/110 AR; 264/174; 264/236; 425/114
[58] Field of Search ........................ 264/174, 236, 135; 425/114; 174/110 AR, 113 R, 117 R

[56] References Cited

U.S. PATENT DOCUMENTS

| | | | |
|---|---|---|---|
| 1,862,005 | 6/1932 | Cherry et al. | 425/114 |
| 3,102,160 | 8/1963 | Cook et al. | 264/174 |
| 3,148,169 | 9/1968 | Martens | 478/447 |
| 3,328,510 | 6/1967 | White | 174/117 R |
| 3,681,515 | 8/1972 | Mildner | 174/113 R |

OTHER PUBLICATIONS

Luh—Ethylene—Propylene Terpolymers in Wire & Cable Constructions—Wire & Wire Products—Apr. 1970, pp. 79-81.
Keeley et al.—New EPDM Developments for Electrical Industry Applications—Dupont, 1974, pp. 1-17.
Bedwell—Types of Nordel Hydrocarbon—Dupont Brochure, 1974.

Primary Examiner—Jeffery R. Thurlow
Attorney, Agent, or Firm—Roy C. Hopgood; John M. Calimafde; Charles W. Neill

[57] ABSTRACT

This telephone drop wire is insulated with an improved insulation made from a semi-crystalline, low molecular weight, ethylene-propylene diene terpolymer (EPDM) which is used for a unipass insulation. The insulation has improved electrical properties which permit thinner sections of insulation to be used, so that the overall cross-section of the drop wire is of lower cost, higher temperature rating, and with moisture resistance suitable for use buried underground. The insulation is also much tougher for use where abrasion is a factor.

8 Claims, 2 Drawing Figures

METHOD OF MAKING FLAME RETARDANT EPR UNIPASS TELEPHONE DROP WIRE

RELATED APPLICATION

This application is a continuation of application Ser. No. 831,474, filed Sept. 8, 1977, now abandoned for FLAME RETARDANT EPR UNIPASS TELEPHONE DROP WIRE. cl RELATED PATENT U.S. Pat. No. 3,148,169 relates to the loading of EPDM polymers of the type used for this invention.

BACKGROUND AND SUMMARY OF THE INVENTION

Unipass insulation has been used for telephone drop wires. With such an insulation, one compound takes the place of both the insulation and the jacket formerly used in conventional standard cable design. With unipass telephone drop wires of the prior art, however, polyvinyl chloride (PVC) has been the principal ingredient of the insulation.

The unipass telephone drop wire of this invention uses a semi-crystalline, low molecular weight, ethylenepropylene diene terpolymer (EPDM) as the principal insulation ingredient with comparatively small amounts of filler and preferably with fire-retardant ingredients as required by the underwriters. The formulation will be explained more fully in connection with the main body of this specification.

Because of the improved electrical characteristics of this invention, the cross-section of a telephone drop wire can be reduced from 0.160"×0.300" for the prior art PVC insulation to 0.135"×0.230" with the EPDM polymer of the present invention, thus saving cost and weight; and the improved drop wire of this invention has other advantages, including better insulation resistance; lower attenuation; higher temperature rating; improved flexibility at low temperature; and excellent moisture resistance which makes the drop wire suitable for burying underground.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

This invention is based on the discovery that a much improved unipass telephone drop wire can be made with the principal ingredient of the insulation an ethylenepropylene diene terpolymer, herein referred to as "EPDM." The particular EPDM polymer used for this invention is semicrystalline and of low molecular weight.

EPDM suitable for this invention has a specific gravity of approximately 0.85; is light amber in color; and has a mooney viscosity; ML (1+4) at 250° F. (121 C°.) of about 25.

An EPDM having the characteristics above described is available from the Du Pont Company of Wilmington, Del., under the trade name "NORDEL 2722." There may be other semi-crystalline, low molecular weight polymers which are chemical equivalents of NORDEL 2722, but at the present time we do not know of any.

An important advantage of the semi-crystalline, low molecular weight EPDM polymer is that it can be processed with low filler level (for example, about 47 parts of filler to 100 parts of polymer), and this lower filler level results in markedly improved electrical properties as compared with conventional EPDM compounds where the filler level is approximately 110 phr. The diene content of the EPDM polymer of this invention leads to high cross-link density in the cured insulation and thereby compensates for the low filler level.

In addition, low density polyethylene, equal to about 18 parts per 100 parts of polymer, can be used in place of the conventional process oil with the low filler loadings of this invention. This change results in high modulus and high tensile strength; both parameters are needed in a good drop wire.

The use of a semi-crystalline, low molecular weight EPDM polymer not only results in a tough insulation compound but also one that is easily processed at low filler level. The compression cut of the insulation of this invention, based on about 47 phr of clay, is 60-90 percent greater than insulations based on conventional amorphous polymers such as Du Pont's NORDEL 1040 or NORDEL 1070.

Underwriters Laboratories require that telephone drop wire have insulation which is flame-retardant. Such an insulation will burn when flame is applied to it; but when the flame is withdrawn, the insulation will stop burning within a short time specified by Underwriters Laboratories.

The insulation of this invention is made fire-retardant by adding to the formulation a chlorine additive and antimony oxide. Suitable chlorine additives include a product made by the Hooker Specialty Chemicals Company of Niagara Falls, N.Y., under the trade name "Dechlorane," or a product made by the Diamond Alkali Company, under the trade name "Chlorowax 70". The amount of chlorine additive depends upon the type used and can vary, by way of example, from about 65% to 77%. For adequate flame-retardant properties, antimony oxide should be added to the chlorine additive in a percentage of approximately 1-2, this being given merely by way of illustration.

Figure 1:
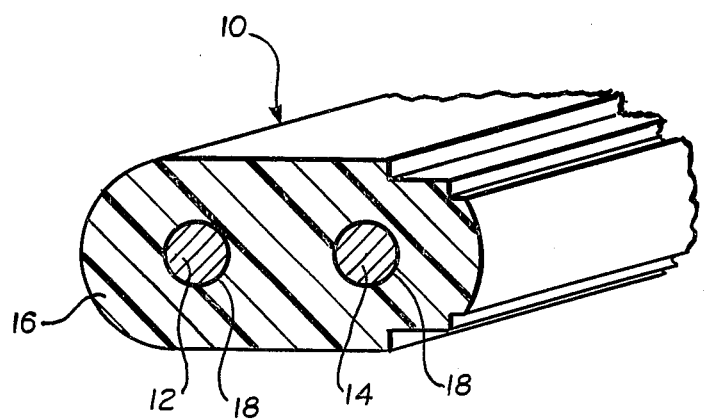
FIG. 1 is an isometric view, mostly in section, showing a telephone drop wire made in accordance with this invention.

FIG. 1 shows a telephone drop wire 10 having conductors 12 and 14 embedded in the unipass insulation 16, which is made from the semi-crystalline, low molecular weight EPDM polymer already described. In the preferred construction, the conductors 12 and 14 are coated with adhesive 18 applied to the conductors 12 and 14 before the insulation 16 is extruded over the conductors.

The preferred construction uses an adhesive sold by the Dayton Chemical Products Division of Whittaker of West Alexandria, Ohio, under the trade name "Thixon XAP 1788." Other adhesives can be used; and another specific example is that sold by the Hughson Chemical Lord Corporation of Erie, Penna., under the trade name "Chemlok B-2197-65."

Figure 2:
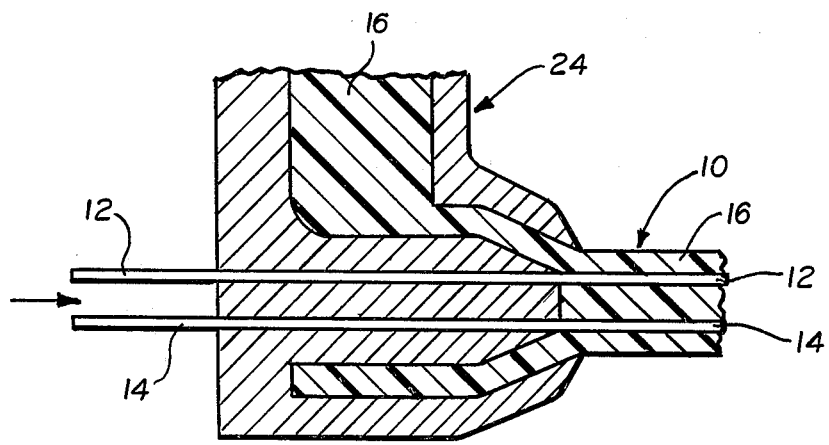
FIG. 2 is a diagrammatic view showing the unipass application of the insulation to the conductors of the drop wire.

FIG. 2 is a diagrammatic illustration showing an extruder 24 by which the insulating material 16 is extruded over the conductors 12 and 14 in a single pass which applies the insulation 16 that takes the place of both the insulation for the conductors 12 and 14 and a jacket for the drop wire.

The drop wire 10 passes from the extruder 24 to a conventional continuous vulcanization apparatus (not shown) in which the insulating material is cross-linked, preferably to the degree of becoming thermo-set.

As compared with a conventional unipass polyvinyl chloride insulated telephone drop wire, this invention makes a drop wire which is approximately 10% lower in cost. The insulation resistance of this improved drop wire is approximately 14,500 megohms per thousand feet, as against 240 megohms for the polyvinyl chloride insulation. The dry mutual capacitance per mile is lower (0.090 micro-microfarads as compared to 0.134 for the PVC). This results in lower attenuation.

The temperature rating of the insulation on the drop wire of this invention is approximately 90° C. as compared with 60° C. for the polyvinyl chloride insulated drop wire. The dielectric strength of this invention is higher than that of polyvinyl chloride insulated drop wires by a ratio of 20 kilovolts to 11 kilovolts. This advantage lessens the potential failure at the clamps as a result of lightning. Improved flexibility at low temperatures is an important advantage when installing the drop wires in cold weather.

All of these advantages are the result of the use of the semi-crystalline, low molecular weight ethylene-propylene diene terpolymer for the insulation coating on the unipass telephone drop wire of this invention. As explained above, this terpolymer requires less filler; and it can be used with low-density polyethylene to facilitate the diceability of the compound, and to eliminate the use of process oil, while at the same time improving the modulus and tensile strength. For 100 parts of the EPDM terpolymer, the number of parts of low-density polyethylene is preferably between 5 and 25 parts. The drop wire of this invention is intended for use as telephone drop wire; but it can be used for other purposes where the same characteristics are desirable.

The preferred embodiment of the invention has been illustrated and described, but changes and modifications may be made, and some features can be used in different combinations without departing from the invention as defined in the claims.

What is claimed is:

1. The method of making a unipass telephone drop wire including mixing together as the principal insulation ingredient a semi-crystalline, low molecular weight, ethylene propylene diene terpolymer, having a specific gravity of approximately 0.85, being light amber in color, and having a Mooney viscosity ML (1+4) at 250°. F (121° C. ) of about 25, with lesser amounts of polyethylene and with a clay filler less than approximately 47 parts of filler to 100 parts of polymer but sufficient to provide the insulation with the strength characteristics required by commercial telephone drop wire specifications such as cut-through strength, the insulation being compounded to provide an insulation resistance substantially greater than 240 megohms, a dry mutual capacitance per mil lower than 0.134 resulting in lower attenuation, and a temperature rating substantially higher than 60° C., simultaneously extruding the insulation over parallel spaced conductors of the drop wire with the conductors close enough to connect the insulation, curing and cross-linking the insulation with the diene content of the insulation providing a high cross-link density that compensates for the low filler level.

2. The method described in claim 1 characterized by adding to the ethylene propylene diene terpolymer a low density polyethylene between 5-25 parts to 75-95 parts of ethylene propylene diene terpolymer.

3. The method described in claim 1 characterized by compounding the polymer with about 47 parts of treated clay and approximately 18 parts of the low density polyethylene to approximately 72 parts of ethylene propylene diene terpolymer.

4. The method described in claim 1 characterized by including in the insulation a chlorine additive and antimony oxide in sufficient quantity to impart flame-retardant properties to the insulation.

5. The method described in claim 4 characterized by including in the insulation about 30 parts of chlorine additive per 100 parts of polymer and approximately ½ as much antimony oxide as chlorine additive.

6. The method described in claim 1 characterized by holding the two spaced conductors parallel to one another and extruding over them the insulation as a unitary section that insulates the conductors and holds them in their parallel relation to one another.

7. The method of making a telephone drop wire, including advancing a plurality of electric conductors along parallel paths spaced from one another and through guides in an extruder, extruding simultaneously over both of the conductors a semi-crystalline, low molecular weight ethylene-propylene diene terpolymer insulation with top and bottom surfaces of the insulation between the conductors having generally flat top and bottom surfaces substantially parallel to a center transverse center line through the axes of the conductors of the character described, and passing the plurality of conductors and their extruded covering through a continuous vulcanizer to cure and cross-link the extruded insulation polymer to a thermo-set condition.

8. The method of making a telephone drop wire as described in claim 7 characterized by applying an adhesive to the conductors before extruding the terpolymer over the conductors.

* * * * *